Oct. 8, 1940.                J. U. LEHN ET AL                2,216,918
                                ANIMAL TRAP
                              Filed July 20, 1939
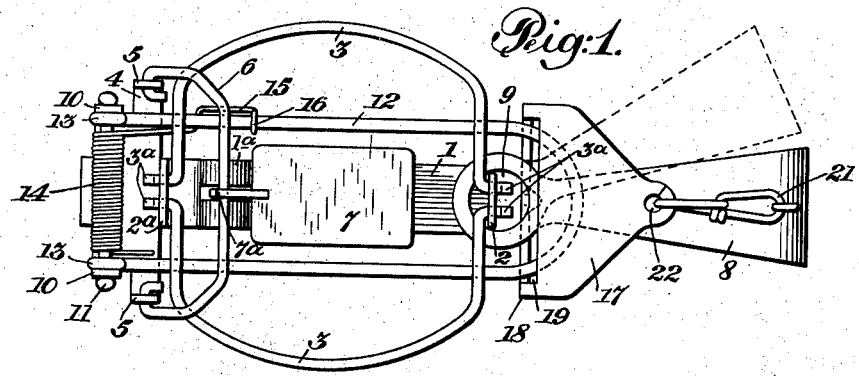
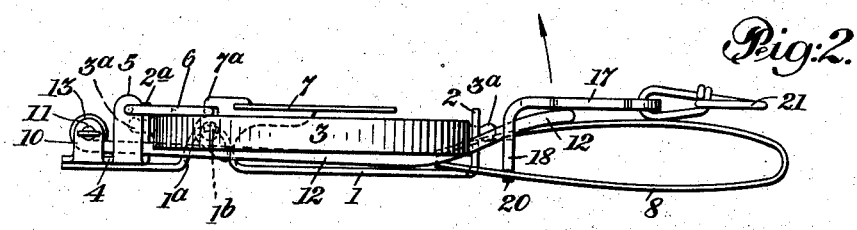
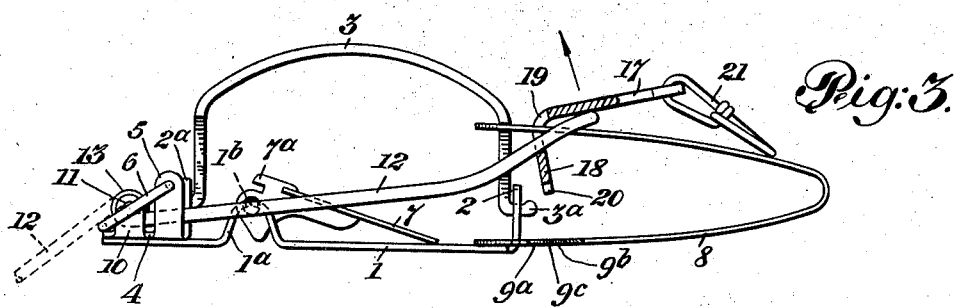
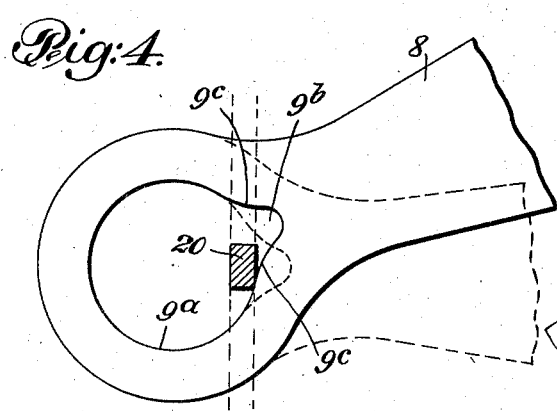
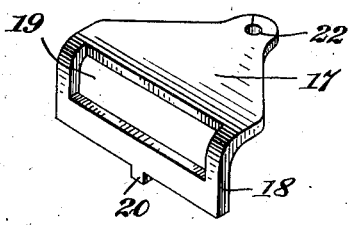

Patented Oct. 8, 1940

2,216,918

UNITED STATES PATENT OFFICE 2,216,918

ANIMAL TRAP

John U. Lehn, Lititz, and Herman Drach, Lancaster, Pa., assignors to Animal Trap Company of America, Lititz, Pa., a corporation of Pennsylvania Application July 20, 1939, Serial No. 285,468

5 Claims. (Cl. 43—90)

Our invention consists in the novel features hereinafter described, reference being had to the accompanying drawing, which illustrates one embodiment of the same, selected by us for purposes of illustration, and the said invention is fully disclosed in the following description and claims.

Our invention relates to animal traps such as are used for the trapping of muskrats and other animals which are provided, in addition to a pair of spring actuated jaws, with a leg guard such as is illustrated, described and claimed in Letters Patent No. 1,912,457, granted June 6, 1933, to John U. Lehn, for the purpose of sliding up the leg of the animal caught in the jaws and engaging a portion of the body of the animal without injuring the animal or impairing the pelt in any way to restrain lateral movements of the imprisoned leg, and also preventing the animal from reaching that portion of the leg adjacent to the jaws to gnaw it off, or in other words, to prevent what is termed "wringing off" by the users of such traps. When the trap is set under water, as is usually done in trapping muskrats, the water retards the speed of the jaws so that they do not strike the leg of the animal with as sudden force as when the action takes place in the air. In addition to this, the wet leg of the muskrat is somewhat slippery, so that it takes a little time before the jaws take a firm hold on the muskrat's leg. If the guard releases immediately after the snapping of the jaws, the tension of its spring sometimes aids the animal in its attempts to escape before the jaws of the trap are sufficiently set on the animal's leg. Our invention provides for delaying the action of the guard so that it will not function until the animal is firmly caught in the jaws of the trap, and by its efforts to escape therefrom, places a strain on the securing chain or other flexible connection by which the trap is secured in place. This is accomplished by attaching the chain to the delayed action device which engages the guard, and our invention also has for its object the provision of means whereby the delayed action device may be securely locked over the guard by the turning of the spring so that the chain will support the weight of the set trap and may be used for placing it in the same manner as the chain of any ordinary trap, without danger of removing the delayed action plate from the guard.

Our invention is applicable to a trap of the "long spring" type and comprises the novel features hereinafter described and illustrated in the accompanying drawing.

In the said drawing:

Fig. 1 is a top plan view of a long spring trap provided with a leg embracing guard and delayed action means embodying our present invention, showing the parts in set position.

Fig. 2 is a side elevation of the trap in the position shown in Fig. 1.

Fig. 3 is a side elevation showing the trap jaws sprung and the action of the guard delayed.

Fig. 4 is an enlarged detail view showing the method of locking the chain attaching plate which provides the delayed action of the guard.

Fig. 5 is a detail perspective view of the chain attaching plate and delayed action device illustrated in Figs. 1, 2 and 3.

In the accompanying drawing, 1 represents the base plate of the trap which is provided at the ends with the upwardly extending portions 2, 2a, provided with pivotal apertures for receiving the pivotal portions 3a of the jaws 3, 3. In this instance the base is provided with a cross piece 4, riveted, brazed or otherwise secured to the base 1, and in this instance having the upwardly extending jaw supporting portion 2a formed integral therewith. The cross piece 4 is provided at its opposite ends with vertically disposed portions 5, 5, each of which is perforated to receive one end of a pivoted locking bail 6. The base 1 has an upwardly curved portion 1a provided with a pivotal support 1b to engage the pan 7, which is provided with the usual detent 7a. 8 represents the long spring, the ends of which are provided with apertures 9, the aperture in the lower spring arm engaging the upturned portion 2 of the base, and the aperture in the upper spring arm engaging the adjacent portions of the jaws for forcing them together in the usual manner.

The cross piece 4 is also provided with upwardly extending portions 10, 10 which are engaged by a pivot shaft 11, upon which the leg embracing guard 12 is pivoted. This guard ordinarily comprises a single piece of wire or other suitable metal, bent in U-shape, and having its outer ends provided with eyes 13 to engage the pivot shaft 11. The shaft 11 is encircled by a coil spring 14 having one end engaging the cross piece 4 and the other end forming a spring actuating arm 15, the outer end of which is operatively connected with one arm of the guard 12 so that the spring will tend to move the arm in the direction of the arrow in Figs. 2 and 3.

17 represents the delayed action plate, which is preferably formed with a part 18 bent at right angles downwardly and provided with a transverse slot, indicated at 19, of sufficient vertical width to embrace the upper arm of the spring 8, and the guard, as indicated in Figs. 1, 2 and 3, to effect the delayed action of the guard when the trap is sprung as hereinafter described. The outwardly extending portion 18 of this delayed action plate is also provided with a centrally downwardly extending lug 20 and the aperture 9a in the lower spring arm is provided with a recessed portion 9b in alignment with the center of the spring and in position to receive the lug 20 when the trap is set. The attaching chain, a portion of which is indicated at 21, is preferably attached to the delayed action plate by means of an aperture 22 and will be provided with the usual ring and spike, or other means for attaching it to the ground or to a stick, or other means for securing the trap from being carried away by the animal.

To set the trap, the guard is swung over the jaws of the trap into engagement with the upper arm of the spring 8. The upper arm of the spring and guard are then depressed, which will permit the jaws to separate and swing down over the guard. The bail 6 is then swung over the adjacent portions of the jaws, in the manner illustrated in Figs. 1 and 2, and engaged with the detent 7a of the pan 7. The delayed action plate is then moved along the spring until the free end of the guard enters the aperture 19 in said plate, the projection 20 of the delayed action plate resting in the recess 9b in the aperture of the lower spring arm. The spring is then swung laterally from the position shown in full lines in Fig. 1 and dotted lines in Fig. 4, to the position shown in dotted lines in Fig. 1 and full lines in Fig. 4. The portions 9c, 9c at opposite sides of the notch or recess 9b form cam portions which engage the outer face of the projection 20 on the delayed action plate 17, tending to press it in a direction toward the center of the trap and forcing the main body of the plate 17 down upon the guard 12, which is thereby forced into firm engagement with the upper face of the upper arm of the spring. In this position, the parts are locked so that the weight of the trap can be supported from the chain or connection 21 without permitting the delayed action plate to move rearwardly with respect to the spring. It follows, therefore, that after setting the trap as previously described, the chain may be used for lifting the trap and placing it in position for use in the same way, as if it were attached to the trap in the ordinary manner.

The trap will be sprung by the animal depressing the pan 7, which will release the bail 6, thereby instantly releasing the jaws which come together upon the leg of the animal. The upward movement of the upper arm of the spring which closes the jaws in the usual manner, will carry with it the guard and the delayed action plate 17, which, being above the guard, prevents the immediate release of the guard, as will be clearly seen in Fig. 2, while at the same time the projection 20 is withdrawn from the aperture in the lower arm of the spring, so that the delayed action plate can be drawn rearwardly of the spring to disengage the guard. The struggles of the animal to release itself from the jaws will naturally move the trap away from the secured end of the chain 21, and as soon as the chain is drawn taut, further movement of the trap will disengage the delayed action plate 17 from the guard which will spring over in the direction of the arrows in Figs. 2 and 3, sliding up the animal's leg and engaging its body and holding it against the possibility of wringing off. The delayed action plate insures that under conditions previously described, the animal will have been firmly caught and held by the jaws before the guard comes into action and prevents the possibility of the guard tension aiding the animal in its struggles to escape before the jaws are sufficiently set on the animal's leg. Should a foreign object spring the trap by coming into contact with the pan, the guard will remain in partially sprung condition which will indicate to the trapper the cause of the sprung trap.

It will be seen that when the trap is fully set, as previously described, the guard actuating spring exerts an upward pressure on the delayed action plate 17 so that when the trap is sprung by the animal depressing the pan and releasing the bail, the guard 12 will rise simultaneously with the upper arm of the spring 8, raising the delayed action plate 17 and bringing the lower edge of the slot 19 into contact with the lower face of the upper spring arm, thus adding the force of the guard spring 14 to the force of the spring 8 in effecting the closing of the jaws.

The outer end of the guard 12 is also preferably bent upwardly, as shown in the drawing, but this is not essential. In either case, as the guard rises, the inclination of the outer end thereof will tend to prevent the delayed action plate from slipping off of the end of the guard in case the attaching chain should be fairly taut and before a substantial strain is placed upon it by the struggles of the animal.

What we claim and desire to secure by Letters Patent is:

1. The combination with a trap having gripping means and a separate leg embracing guard, and spring actuating means therefor, of a plate for temporarily arresting the action of said guard after the trap is sprung, an anchoring connection for the trap attached to said plate, and means for positively locking said plate against movement in a direction to release said guard when the trap is in set position, whereby the trap may be carried in set position by said anchoring connection without disengaging the plate from the guard.

2. A trap having a pair of opposed pivoted jaws, a flat spring having an actuating arm provided with an aperture engaging said jaws, setting and releasing means for said jaws, and a spring actuated leg embracing guard having its pivotal axis substantially perpendicular to the pivotal axes of the jaws, and adapted to pass over the jaws when the latter are in released position, and a delayed action plate for said guard having a sliding engagement with the jaw actuating spring, and having a part for engaging the guard, means operable when the trap is in fully set position for locking said plate against movement in a direction to release the guard, and an attaching means for anchoring the trap connected to said plate, whereby the trap may be carried in set position by said anchoring means without disengaging said plate from the guard.

3. A trap having a base provided with upwardly extending portions, a pair of opposed jaws pivotally connected therewith, a flat spring having upper and lower arms provided with apertures engaging respectively one of said upwardly extending portions of the base, and the adjacent portions of said jaws, locking and releasing means for said jaws, a spring actuated leg embracing guard adapted to pass over said jaws when the latter are in released position, and held in set position by the jaws in the set position of the trap, and a delayed action plate having a sliding engagement with the upper arm of the jaw actuating spring and having a part for engaging the outer end of the guard the lower arm of said spring having an aperture and said plate having a projection to engage said aperture when in set position, said arm having cam portions for engaging said projection, upon turning the spring laterally with respect to the base, to lock the said plate against outward movement with respect to the said spring, and attaching means for anchoring the trap secured to said plate permitting the trap when fully set to be carried by said attaching means without removing said plate from the guard.

4. A trap having a base provided with upwardly extending portions, a pair of opposed jaws pivotally connected therewith, a flat spring having upper and lower arms provided with apertures engaging respectively one of said upwardly extending portions of the base, and the adjacent portions of said jaws, locking and releasing means for said jaws, a spring actuated leg embracing guard adapted to pass over said jaws when the latter are in released position, and held in set position by the jaws in the set position of the trap, and a delayed action plate having a sliding engagement with the upper arm of the jaw actuating spring and having a part for engaging the outer end of the guard, the apertured portion of the lower spring arm being provided with a recess extending rearwardly and providing cam portions on opposite sides thereof, said delayed action plate having a downwardly extending projection to engage said recess when the trap is in set position, and adapted to be engaged by one of said cam portions upon the turning of said spring laterally with respect to the base, to lock said plate against outward movement with respect to said spring, and attaching means for anchoring the trap secured to said plate, permitting the trap when fully set to be carried by said attaching means without disengaging said plate from the guard.

5. A trap having a base provided with upwardly extending portions, a pair of opposed jaws pivotally connected therewith, a flat spring having upper and lower arms provided with apertures engaging respectively one of said upwardly extending portions of the base, and the adjacent portions of said jaws, locking and releasing means for said jaws, a spring actuated leg embracing guard adapted to pass over said jaws when the latter are in released position, and held in set position by the jaws in the set position of the trap, and a delayed action plate having a sliding engagement with the upper arm of the jaw actuating spring and having a part for engaging the outer end of the guard, the lower arm of said spring having an aperture and said plate having a projection to engage said aperture when in set position, said arm having cam portions for engaging said projection, upon turning the spring laterally with respect to the base, to lock the said plate against outward movement with respect to the said spring, and attaching means for anchoring the trap secured to said plate, permitting the trap when fully set to be carried by said attaching means, without releasing the guard, the portion of said guard engaging the delayed action plate being inclined upwardly and rearwardly when in engagement therewith and holding said plate against accidental disengagement with the guard upon the closing of the jaws.

JOHN U. LEHN.
HERMAN DRACH.